Patented June 13, 1950

2,511,498

UNITED STATES PATENT OFFICE 2,511,498

RUBBER IMPREGNATED FABRICS

Willem Leendert Johannes de Nie and Gottfried Ernst Rumscheidt, Amsterdam, Netherlands, assignors to Shell Development Company, San Francisco, Calif., a corporation of Delaware No Drawing. Application July 14, 1947, Serial No. 760,930. In the Netherlands April 8, 1943

Section 1, Public Law 690, August 8, 1946
Patent expires April 8, 1963

17 Claims. (Cl. 117—139.5)

This invention relates to the production of novel materials which find particular utility in the impregnation of fabrics to impart crease-resistance and water-repellent properties thereto, the said novel materials being water-soluble reaction products of rubber compounds with oxygen-containing inorganic acidifying compounds.

The term "rubber compound," as employed herein, is intended to embrace natural rubber and its various unsaturated derivatives, including latex, crepe, sheet, Caoutchouc, gutta percha and cyclo rubber. These compounds all have a high molecular weight (in excess of 5,000) and they are unsaturated in greater or lesser degree. Various plasticizers, fillers and like inert ingredients may also be present in the rubber compound.

The term "oxygen-containing inorganic acidifying compound," as employed herein, is intended to include the various inorganic acids and acid anhydrides wherein the acid-forming element, if possessing more than one valency, is present in a valency other than the highest thereof, and wherein oxygen is present as a molecular component. While the compound of this type which finds the most general usage is sulfur dioxide, other representative compounds included within the term are phosphorus trioxide, nitrous trioxide, nitrous acid and phosphorus acid. The term does not include such compounds as sulfur trioxide, phosphorus pentoxide, nitrogen pentoxide or the corresponding acids of such compounds, for here the acid-forming element, be it either sulfur, phosphorus or nitrogen, is present in the highest of several possible valencies.

It is known that a variety of useful products, sometimes hereinafter referred to as "rubber-acid" products, can be formed by reacting a rubber compound with an inorganic acidifying compound. This reaction may be brought about in many ways. One method is to mix the rubber compound with the acidifying compound, though the preferred practice is to dissolve the rubber compound in a solvent as benzene, xylene, toluene, dioxane or the like, and then to bring the resulting solution into reactive engagement with an acidifying compound such as sulfur dioxide. For example, when gaseous sulfur dioxide is used, it may be bubbled into the solution of rubber or passed over the surface of a supported layer of such liquid, and in either case a gel-like water-insoluble reaction product is obtained. Much the same type of product is formed when sulfur dioxide, or other inorganic acidifying compound, in either the liquid or solution form, is mixed with the rubber solution. In other cases, a reaction product of a somewhat more dense and solid character is formed by introducing the rubber solution into a bath containing dissolved sulfur dioxide or an equivalent material. This latter procedure is commonly adopted when forming thread-like filaments of rubber, the solvent medium for the acidifying compound in this case being a substance such as water, or a water-alcohol mixture, in which both the rubber compound and the resulting rubber-sulfur dioxide reaction product are insoluble.

Processes for bringing about reaction between rubber compounds, inter alia, and inorganic acidifying compounds, whether oxygen-containing or not, are described in U. S. Patents No. 2,185,656, issued Jan. 2, 1940, No. 2,198,927, issued April 30, 1940, No. 2,265,722, issued December 9, 1941, and No. 2,288,982, issued July 7, 1942, and reference is hereby made to the said patents for a more complete description of methods employed in forming reaction products of this character. In our copending application, Serial No. 760,924, filed July 14, 1947, now Patent No. 2,469,847, it is pointed out that under certain conditions, and particularly when employing rubber and other materials of higher purity, the reaction between the rubber compound and the inorganic acidifying compound proceeds at an abnormally slow rate. The said application discloses that this reaction may be speeded up through use of one or more oxygen-yielding materials, particularly hydroperoxides such as hydrogen peroxide, tetralin peroxide, and the like. Reference is made to the said copending application for a more complete description of the methods there disclosed.

While the rubber-acid reaction products described above have a wide variety of uses, they have not been available in a water-soluble form. Such a solution, if available, would be a highly useful one, for it would offer the possibility of application to textiles and other fabric materials to improve the properties thereof.

It is an object of this invention to provide a novel reaction product of natural rubber and an oxygen-containing inorganic acidifying compound, which reaction product will be soluble in water. Another object is to provide a method for the manufacture of a water-soluble product of this nature.

A further important object of this invention is to provide a process for rendering textiles and related materials both crease-proof and substantially water-resistant, through use of said water-soluble reaction products.

The nature of these and other objects of the present invention will become clearly apparent on a consideration of the following description.

It has been discovered that when a material consisting of a natural rubber compound reacted with an oxygen-containing inorganic acidifying compound is subjected to treatment in an aqueous solution of one or more alkaline reacting substances, a water-soluble product is obtained which, though having lost a substantial portion of its inorganic acidifying component, still retains many of the properties of the original rubber-acid reaction product. This novel product, when applied to a fabric in aqueous solution form, can be precipitated onto the fabric by bringing the applied solution into reactive engagement with sulfur dioxide or an equivalent acidifying compound. The resulting treated fabric material, when dried, will be substantially crease-proof and water-resistant.

The alkaline reacting substances useful in treating the said reaction product may be either organic or inorganic in nature. Suitable inorganic substances, for example, are the hydroxides, carbonates and sulfides of the alkali metals, sodium, potassium, lithium, cesium and rubidium, as well as the hydroxides and carbonates of the alkaline earth metals, barium, strontium, calcium and magnesium. The alkaline reacting substances of an organic nature which may be used in carrying out the present invention in general comprise the organic bases as, for example, aniline, morpholine, pyridine, diethanolamine, triethanolamine, and the like. Of these various alkaline reacting substances, it is preferred to use potassium hydroxide or sodium hydroxide.

In carrying out the treatment with the alkaline reacting substance, the rubber-acid reaction product, however prepared, is brought into intimate contact with an aqueous solution containing one or more of the said alkaline reacting substances. The added reaction product should be capable of ready dispersion in the aqueous solution. The gel-like products described above which are formed by introducing sulfur dioxide or other suitable acidifying compounds into a solution of the rubber compound, for example, are in the condition best adapted to be dispersed. It is preferred to add an organic dispersing agent, as ethyl alcohol, methyl alcohol, ethyl ether, or the like, to the aqueous solution, the said agent aiding in the initial dispersion of the rubber-acid reaction product and in the maintenance thereof in the dispersed condition during treatment in the alkaline solution. Methyl alcohol is the compound of this type which is preferred for use as a dispersing agent.

Representative alkaline solutions which are suitable for use in practicing the invention are those containing from about 10% to as much as 80% or 90% by weight of the organic dispersing agent, together with a quantity of the alkaline reacting substance sufficient to provide a solution of from about 0.25 to 5 N. Preferred solutions are those containing from about 50% to 80% by weight of the organic dispersing agent and sufficient alkaline material, as sodium hydroxide or potassium hydroxide, for example, to provide a solution which is about 0.5 to 1.5 normal. The balance of the solution is substantially made up of water. It should be understood that the organic dispersing agent may be omitted altogether if desired, and that somewhat stronger or weaker solutions of the alkaline material than those indicated may be used without departing from the spirit and scope of the present invention.

The aqueous alkaline solutions indicated above are effective to produce limited amounts of water-soluble material from the said rubber-acid reaction products even at room temperatures, provided the treatment be carried on for several hours. However, the process becomes much more efficient at higher temperatures, i. e., those above about 50° C. The preferred practice is to boil the alkaline solution during the necessary treating interval, or until as much of the reaction product as possible has been brought into solution. An appreciable quantity of the product will normally be dissolved even with a boiling period as short as one minute, provided the alkaline solution is not too dilute, though a preferred practice is to boil the solution from about 5 to 30 minutes. On the other hand, boiling periods of an hour or more are by no means uncommon.

The yield of water-soluble product obtained by treatment in the alkaline solution is dependent not only upon the conditions of the treatment discussed in the preceding paragraphs, but also on the degree of saturation of the rubber compound by sulfur dioxide or other oxygen-containing, inorganic acidifying compound employed in forming the reaction product. When treating products of the more saturated variety, as, for example, those containing from about 15% to about 25% by weight of sulfur, it proves possible to dissolve substantially all of the rubber-acid reaction product in the aqueous alkaline solution. The dissolved material still retains an appreciable proportion of its acidifying component, the residual sulfur content normally being from about 6% to 12% by weight when the original reaction product was of the more completely saturated variety. On the other hand, when treating reaction products which contain relatively lower proportions of acidifying compound, the yield of water-soluble reaction product is somewhat less. Treatment of the rubber-acid reaction products in aqueous alkaline solutions as provided herein causes only slight modification or decomposition of the said products other than to remove a portion of the acidifying component, the high molecular weight of the products remaining substantially unchanged.

The aqueous alkaline solution of rubber-acid reaction product obtained in the manner described above may be used directly in the treatment of textiles, though preferably a purer solution is provided by first precipitating the dissolved product and then redissolving it in a further aqueous solution. If desired, the solution may first be centrifuged to effect primary separation of liquid from any undissolved material present before precipitating the dissolved reaction product. Precipitation of the material is effected by acidifying the solution, preferably with a mineral acid such as sulfuric or hydrochloric acid. The strength of the acid is not critical, though it proves convenient to use a 2 N solution of either of the acids mentioned. The acid should be added until precipitation of the dissolved rubber-acid reaction product in the form of a coagulum is complete, a condition normally reached when the solution has a pH of about 2. The coagulum is then washed free of salts and other impurities with a dilute acid solution, after which the washed material is dissolved in an aqueous solution which preferably is made slightly alkaline, as by the addition of a small amount of sodium or potassium hydroxide. The resulting solution can be used in the "as is" condition, or can be made neutral or even slightly acid, before being applied to textile materials in the manner to be hereinafter described. While the solubility of various coagulums in aqueous solutions will vary depending on the nature of the component materials, it normally proves possible to obtain solutions having a concentration of at least 5% or 10% of the rubber-acid product.

Solutions obtained in the manner described above may now be applied to fabrics or textiles in any convenient manner, the preferred practice being to dip the fabric in the solution. The amount of solution to be left on the fabric, no matter how deposited, will vary somewhat depending on the strength of the solution as well as on the amount of material to be left on the fabric. For example, when using a solution containing about 5% by weight of the dissolved rubber-acid product, it is preferred to apply an amount of solution equivalent to from about 100% to 200% of the weight of the fabric, though larger or smaller amounts can, of course, be used with successful results. By drying the solution-bearing fabric, a resilient layer of a rubber-acid product is deposited deep within the fabric, the presence of which layer has the effect of imparting crease-resistant qualities to the material as a whole. However, the resulting product has poor water-resistance qualities. It has been discovered that a water-insoluble layer, or film, of rubber-acid product may be deposited on the fabric by exposing the wet, solution-bearing fabric to the action of an inorganic acidifying compound, and preferably to a gaseous sulfur dioxide environment. The term "inorganic acidifying compound" is here synonymous with the term "oxygen-containing inorganic acidifying compound" employed above, except that the compounds coming within the scope of the former term need contain no oxygen, useful non-oxygen containing compounds being hydrogen sulfide and the halogen acids, for example. By treating the wet fabric in this fashion, a further reaction between the dissolved rubber-acid product and the inorganic acidifying compound now presented is evidently brought about, for a water-insoluble material is deposited which is even tougher and more resilient than that obtained by evaporating the solution in the manner described above.

As has already been noted, it is preferred to employ sulfur dioxide to effect precipitation of the water-insoluble material on the fabric, and more particularly, the preferred manner of using the sulfur dioxide is to expose the wet fabric to the action of a gaseous sulfur dioxide environment. The period during which the wet fabric should be left in contact with the said gas will vary somewhat depending on the concentration of the gas, the amount of liquid present on the fabric, the temperature, etc., but normally an exposure time of from about 1 to about 30 minutes will suffice. Longer, or even shorter, periods can be used. A preferred exposure period is from about 10 to 20 minutes when the materials are at room temperature. Other methods of precipitating the rubber-acid reaction product from the solution and onto the textile may, of course, be used, one such method being to dip the wet fabric into a solution containing dissolved sulfur dioxide.

Whatever the method of treatment employed, it is preferred that the solution applied to the fabric contains a quantity, usually about 15% of the weight of rubber-acid material present, of a hydroperoxide, as hydrogen peroxide or tetralin peroxide. The use of a peroxide of this nature, as more particularly described in the said copending application, insures that the reaction between the rubber-acid material present in solution and the acidifying compound here newly presented will be as complete and rapid as possible.

The water-insoluble reaction product deposited on the fabric normally takes the form of a thin coating, or film, which is extremely tough and resilient, and its presence on the fabric makes the material as a whole both crease-proof and water-resistant. The coated fabric may be washed repeatedly without damage to the material present thereon, and inasmuch as the latter is substantially transparent, the natural appearance of the fabric is either maintained or even enhanced.

The following examples will serve to illustrate the manner in which the present invention finds application:

*Example I*

It was desired to render a rayon fabric both substantially crease proof as well as highly water-resistant. To that end, the following procedure was adopted:

Gaseous sulfur dioxide was bubbled into a 6% solution of natural rubber in benzene, thereby producing a gel-like reaction product which, in the dry state, proved to have a sulfur content of 11.3%. Twenty grams of the gel-like product were then dispersed in an aqueous solution made up of 800 cc. of methyl alcohol and 200 cc. of a 3.6 N solution of potassium hydroxide. The resulting dispersion was boiled for 1 hour, which treatment has the effect of dissolving about 75% of the dispersed gel. Following neutralization with sulfuric acid, the boiled mixture was centrifuged. The pH of the clear liquid so obtained was then reduced to about 2 by further additions of sulfuric acid, thereby precipitating a light colored coagulum which was then thoroughly washed with a very dilute solution of sulfuric acid. The washed coagulum was then dissolved in dilute (0.1 N) potassium hydroxide solution, 120 cc. of a 5% solution of the coagulum being so obtained. This solution was activated by the addition of 8 cc. of a 40% hydrogen peroxide solution.

A rayon fabric was then impregnated with a quantity of the solution prepared in the manner described above, the quantity of solution remaining on the fabric being about 130% of the weight of the latter. The wet fabric was then exposed for 15 minutes, at room temperature, to the action of a gaseous sulfur dioxide environment. This treatment resulted in the formation of a hardly discernible, thin, strong, and resilient film of a rubber-sulfur dioxide reaction product which was so firmly bound to the fabric as to be substantially integral therewith. The fabric was then thoroughly dried. The presence of this film in no way detracted from the natural luster of rayon material, and repeated washing of the coated fabric in soap and water did not harm either the film or the said material. The treated fabric was substantially crease-proof, and it proved impossible to wet the same to any appreciable extent. These desirable properties were fully retained even after the fabric had been washed repeatedly.

Example II

A gel-like, rubber-sulfur dioxide reaction product containing (in the dry state) 21% by weight sulfur, was prepared by introducing gaseous sulfur dioxide into a solution comprising 6% by weight natural rubber and 0.9% by weight tetralin peroxide in benzene. This gel was then stirred into a solution made up of ethyl alcohol and a 4 N aqueous solution of sodium hydroxide, approximately 10 parts of the hydroxide solution and 40 parts of the alcohol being used for each part of the gel. The resulting dispersion was boiled for 20 minutes, and at the end of this period substantially all of the gel had gone into solution. Following clarification by centrifuging, the solution was acidified with 2 N hydrochloric acid until substantially all the rubber-sulfur dioxide reaction product present in solution was precipitated as a coagulum. This coagulum, in the dried state, had a sulfur content of 12% and the yield thereof, based on the weight of natural rubber used in preparing the gel, was 120%.

It proved easy to redissolve the coagulum in a slightly alkaline aqueous solution (KOH), and the resulting solution was used in the treatment of textile materials in the same fashion as described above in Example I.

We claim as our invention:

1. The method of forming a water-soluble reaction product of a natural rubber compound and sulfur dioxide, said method comprising dissolving said rubber compound in a solvent therefor, passing gaseous sulfur dioxide through said solution to precipitate an insoluble reaction product of the dissolved rubber compound and sulfur dioxide, dispersing said insoluble product in an aqueous solution of potassium hydroxide and methyl alcohol, boiling said dispersion for a period of at least about 5 minutes to dissolve said dispersed product, and acidifying the solution with mineral acid, thereby precipitating a water-soluble reaction product of said natural rubber compound and sulfur dioxide.

2. A water-soluble reaction product of a natural rubber compound and sulfur dioxide produced by the method of claim 1.

3. The method of forming a water-soluble reaction product of a natural rubber compound and sulfur dioxide, said method comprising dissolving said rubber compound in a solvent therefor; passing gaseous sulfur dioxide through said solution to precipitate an insoluble reaction product of the dissolved rubber compound and sulfur dioxide; dispersing said insoluble product in an aqueous solution containing at least one alkaline reacting substance selected from the group consisting of the hydroxides, carbonates and sulfides of sodium, potassium, lithium, cesium and rubidium, and the hydroxides and carbonates of barium, strontium, calcium and magnesium; boiling said dispersion for a period of at least about 5 minutes to dissolve at least a portion of said dispersed product; and acidifying the solution with mineral acid, thereby precipitating a water-soluble reaction product of said natural rubber compound and sulfur dioxide.

4. A water-soluble reaction product of a natural rubber compound and sulfur dioxide produced by the method of claim 3.

5. The method of forming a water-soluble reaction product of a natural rubber compound and sulfur dioxide, said method comprising dissolving the rubber compound in a solvent, bringing the dissolved rubber compound into reactive engagement with sulfur dioxide to form an insoluble reaction product, dispersing said insoluble product in an aqueous solution of an alkaline reacting substance, maintaining the resulting dispersion at a temperature above 50° C. to dissolve the dispersed material, and acidifying the solution to precipitate a water-soluble reaction product of the natural rubber compound and sulfur dioxide.

6. A water-soluble reaction product of a natural rubber compound and sulfur dioxide produced by the method of claim 5.

7. The method of forming a water-soluble reaction product of a natural rubber compound and sulfur dioxide, said method comprising forming a solution of said rubber compound, bringing said dissolved rubber compound into reactive engagement with sulfur dioxide to form an insoluble reaction product, immersing said product in an aqueous solution of an alkaline reacting substance, maintaining said insoluble product in the alkaline solution until at least part of said substance has dissolved therein, and precipitating said dissolved portion by acidifying the solution, said precipitate being a water-soluble reaction product of said natural rubber compound and sulfur dioxide.

8. A water-soluble reaction product of natural rubber and sulfur dioxide produced by the method of claim 7.

9. In a method of fabric treatment, the steps comprising dispersing a gel-like reaction product of sulfur dioxide and natural rubber in a solution of potassium hydroxide of at least 0.5 normality in a solvent made up of water and methanol, boiling the dispersion for at least five minutes to dissolve at least a portion of the dispersed reaction product, separating the resulting solution from any undissolved material present therein, adding hydrochloric acid to the separated solution until precipitation of a coagulum therefrom is complete, dissolving said coagulum in a dilute solution of potassium hydroxide, wetting a fabric with the solution of dissolved coagulum, subjecting the wet fabric to the action of gaseous sulfur dioxide to precipitate on the fabric a coating comprising a reaction product of natural rubber and sulfur dioxide, and drying the coated fabric.

10. The method of claim 9 wherein there is added the step of treating the dissolved coagulum with a hydroperoxide prior to exposing the wet fabric to the action of sulfur dioxide.

11. In a method of fabric treatment, the steps comprising dispersing a reaction product of natural rubber and sulfur dioxide in an aqueous solution of alkali metal hydroxide, heating the resulting dispersion at a temperature above 50° C. to effect solution of at least a portion of the dispersed reaction product, separating the resulting solution from any undissolved material present therein, acidifying the separated solution with a mineral acid to precipitate a coagulum therefrom, dissolving said coagulum in a dilute alkaline solution, wetting the fabric with the solution of dissolved coagulum, subjecting the wet fabric to the action of gaseous sulfur dioxide to precipitate on the fabric a coating comprising a reaction product of natural rubber and sulfur dioxide, and drying the coated fabric.

12. In a method of fabric treatment, the steps comprising dispersing a reaction product of natural rubber and sulfur dioxide in an aqueous solution of organic base, heating the resulting dispersion at a temperature above 50° C. to effect solution of at least a portion of the dispersed reaction product, separating the resulting solution from any undissolved material present therein, acidifying the separated solution with a mineral acid to precipitate a coagulum therefrom, dissolving said coagulum in a dilute alkaline solution, wetting the fabric with the solution of dissolved coagulum, subjecting the wet fabric to the action of gaseous sulfur dioxide to precipitate on the fabric a coating comprising a reaction product of natural rubber and sulfur dioxide, and drying the coated fabric.

13. In a method of fabric treatment, the steps comprising dispersing a reaction product of sulfur dioxide and natural rubber in an aqueous solution of an alkaline reacting substance, heating said dispersion at a temperature above 50° C. to effect solution of at least a portion of the dispersed reaction product, separating the resulting solution from any undissolved material present therein, acidifying the separated solution with a mineral acid to precipitate a coagulum, dissolving said coagulum in a dilute alkaline solution, applying the solution of dissolved coagulum to a fabric, and bringing the solution-bearing fabric into reactive engagement with sulfur dioxide to precipitate a water-insoluble protective film on said fabric.

14. The method of claim 13 wherein there is added the step of treating the dissolved coagulum with a hydroperoxide prior to bringing the solution-bearing fabric into reactive engagement with sulfur dioxide.

15. A coated fabric produced by the method of claim 13, said coated fabric being characterized by the possession of crease-proof and water-resistance properties and of substantially the same physical appearance as the uncoated fabric.

16. In a method of fabric treatment, the steps comprising dispersing, in an aqueous solution of an alkaline reacting substance, a reaction product of natural rubber with sulfur dioxide; heating said dispersion at a temperature above about 50° C. to effect solution of at least a portion of the dispersed reaction product; applying the dissolved reaction product to a fabric; and bringing the said product-bearing fabric into reactive engagement with sulfur dioxide, to precipitate a protective coating on the fabric.

17. A coated fabric produced by the method of claim 16, said coated fabric being characterized by the possession of crease-proof and water-resistance properties and of substantially the same physical appearance as the uncoated fabric.

WILLEM LEENDERT JOHANNES DE NIE.
GOTTFRIED ERNST RUMSCHEIDT.

REFERENCES CITED

The following references are of record in the file of this patent:

UNITED STATES PATENTS

| Number | Name | Date |
| --- | --- | --- |
| 1,925,879 | Oeusluger | Sept. 5, 1933 |
| 2,031,929 | Breuers et al. | Feb. 25, 1936 |
| 2,191,362 | Widmer et al. | Feb. 20, 1940 |
| 2,212,786 | McQuin | Aug. 27, 1940 |
| 2,265,722 | DeNie | Dec. 9, 1941 |
| 2,379,354 | Hilton | June 26, 1945 |